(12) United States Patent
Coleman et al.

(10) Patent No.: US 11,253,974 B2
(45) Date of Patent: Feb. 22, 2022

(54) VISE WITH MAGNET

(71) Applicant: JPW Industries Inc., LaVergne, TN (US)

(72) Inventors: Micah Coleman, Nashville, TN (US); Charles Weber, Onalaska, WI (US)

(73) Assignee: JPW Industries Inc., LaVergne, TN (US)

( * ) Notice: Subject to any disclaimer, the term of this patent is extended or adjusted under 35 U.S.C. 154(b) by 284 days.

(21) Appl. No.: 16/420,985

(22) Filed: May 23, 2019

(65) Prior Publication Data

US 2019/0358778 A1 Nov. 28, 2019

Related U.S. Application Data

(60) Provisional application No. 62/675,202, filed on May 23, 2018.

(51) Int. Cl.
*B25B 1/00* (2006.01)
*B25B 1/24* (2006.01)
*H01H 36/00* (2006.01)
*B25B 1/02* (2006.01)
*B25B 1/10* (2006.01)
*B25B 11/00* (2006.01)
(Continued)

(52) U.S. Cl.
CPC .............. *B25B 1/2484* (2013.01); *B25B 1/02* (2013.01); *B25B 1/103* (2013.01); *B25B 11/002* (2013.01); *B25H 1/02* (2013.01); *F16B 1/00* (2013.01); *H01H 36/0073* (2013.01); *F16B 2001/0035* (2013.01)

(58) Field of Classification Search
CPC .... B25B 1/00; B25B 1/02; B25B 1/04; B25B 1/18; B25B 11/00; B25B 11/002
See application file for complete search history.

(56) References Cited

U.S. PATENT DOCUMENTS 3,796,506 A 3/1974 Buck
4,541,759 A 9/1985 Miyoshi
(Continued)

FOREIGN PATENT DOCUMENTS

WO 2005092573 A1 10/2005
WO 2009130721 A1 10/2009

OTHER PUBLICATIONS

International Search Report and Written Opinion for PCT/US2019/033760, dated Sep. 10, 2019, 12 pages.

*Primary Examiner* — Lee D Wilson
(74) *Attorney, Agent, or Firm* — Waller Lansden Dortch & Davis LLP; Blake M. Bernard (57) ABSTRACT

A vise for securing a work piece is disclosed which includes a base. A first jaw piece and a second jaw piece can be disposed on the base, at least one of the first and second jaw pieces movable on the base such that the first and second jaw pieces are moveable toward and away from one another. A magnetic assembly can be positioned on the base and configured to produce a magnetic field that extends beyond the base to secure the vise to a magnetically permeable or ferromagnetic work surface. The magnetic assembly can be operable to alternate between an active mode and an inactive mode. The magnetic assembly can produce a magnetic field when the magnetic assembly is in the active mode to secure the vise to a magnetically permeable or ferromagnetic work surface.

15 Claims, 7 Drawing Sheets

(51) Int. Cl.
  *B25H 1/02* (2006.01)
  *F16B 1/00* (2006.01)

(56) References Cited

U.S. PATENT DOCUMENTS

| | | | |
|---|---|---|---|
| 4,572,492 A * | 2/1986 | Kawakita | B23Q 1/28 |
| | | | 269/75 |
| 4,616,796 A | 10/1986 | Inoue | |
| 6,361,034 B1 | 3/2002 | Wolfe | |
| 2004/0239460 A1 | 12/2004 | Kocijan | |
| 2015/0251284 A1 | 9/2015 | Reichert | |
| 2015/0306679 A1 | 10/2015 | Brotto | |
| 2019/0358778 A1* | 11/2019 | Coleman | B25B 11/002 |

* cited by examiner

VISE WITH MAGNET

CROSS-REFERENCES TO RELATED APPLICATIONS

This application is a non-provisional of U.S. Patent Application No. 62/675,202 filed May 23, 2018 entitled WORK TABLE AND CLAMPING VISE WITH MAGNETIC ASSEMBLY, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates to vises for use in the manufacture or fabrication of a work piece. More specifically, the disclosure relates to vises for use in retaining work pieces to be manufactured in a desired position on a work table or work surface.

Work pieces can typically be placed on a work table or work surface as the work piece is being cut, sawed, milled, drilled, nailed, painted, or otherwise worked on, manufactured, or fabricated. It is often desirable to retain the work piece in a desired position on a work table or work surface, or generally prevent movement of the work piece during the manufacturing or fabrication process, as movement of the work piece can produce undesirable errors or flaws in the finished product. Securing work pieces on a work table or work surface during the manufacturing process can be difficult as work pieces can come in a variety of differing shapes, sizes, and materials. Additionally, work pieces may need to be held in varying orientations and positioned on a work table or work surface during the manufacturing process to produce a desired hole, cut, etc.

Common ways of retaining a work piece on a work surface include a user manually holding the work piece in a desired position, which can be cumbersome for the user. Manual pressure to hold the work piece in place is often times not sufficient to maintain the work piece in a desired position once the work piece is engaged by a tool. Mechanical fasteners such as clamps and bolts can also be used to secure the work piece in a desired position on a work surface. Work tables and work surfaces can also include custom stops or guide blocks specifically designed to engage or retain certain types of work pieces, the stop or guide blocks being built into such work surfaces. However, these solutions can typically provide a limited number of positions on the work surface where a work piece can be retained and/or cumbersome fixation mechanisms to secure a clamp, vise, or other retaining member to various positions on the work surface. Such custom work surfaces or work tables can also be costly to manufacture.

Vises can be used to retain a work piece in a desired position on a work table or work surface while the user works on the work piece. A work piece may be placed in a gap between opposing jaws of the vise. The opposing jaws can be moved towards and away from each other to and clamp the work piece between the jaws. This allows a user to retain a work piece in a desired position while the desired procedures are being performed on the work piece.

Traditionally, vises are solid and heavy devices, some consisting of large amounts of heavy metal. Vises can be designed to be heavy such that they resist movement of the vise and thus the work piece while the work piece is being worked on. Vises can be placed on a work surface and anchored by the weight of the vise. The weight of the vises can make them difficult to handle or maneuver, which is undesirable. Alternatively, the vise may be mechanically secured to the work surface by mechanical fasteners, such as bolts or screws. Using mechanical fasteners to secure the vise to the work surface can be cumbersome and time consuming and can limit the possible orientations of the vise, and thus the work piece, on the work surface. Such vises may also require special holes to be formed in the work surface.

What is needed then are improvements in systems and methods for retaining work pieces on a work surface or work table.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a vise for securing a work piece which includes a base. A first jaw piece and a second jaw piece can be disposed on the base, at least one of the first and second jaw pieces movable on the base such that the first and second jaw pieces are moveable toward and away from one another. A magnetic assembly can be positioned on the base and configured to produce a magnetic field that extends beyond the base to secure the vise to a magnetically permeable or ferromagnetic work surface. In some embodiments, the magnetic assembly can be operable to alternate between an active mode and an inactive mode.

The magnetic assembly can produce a magnetic field when the magnetic assembly is in the active mode to secure the vise to a magnetically permeable or ferromagnetic surface. The magnetic field produced by the magnetic assembly when the magnetic assembly is in the active mode can extend beyond the base and in some embodiments beyond a bottom surface of the base to secure the vise to a work surface made of magnetically permeable or ferromagnetic material, such as steel, iron, etc. The use of a magnetic assembly to secure a vise to a magnetically permeable or ferromagnetic work surface can help eliminate the need for more cumbersome securing mechanisms such as bolts screws, clamps etc. Additionally, magnetic forces can be generated to secure the vise to the magnetically permeable or ferromagnetic work surface regardless of the vise's position on that work surface, such that the vise of the present disclosure can be placed in numerous positions on the work surface.

One objective of the present disclosure is to facilitate securement of a vise to a work surface in a quick and convenient manner.

Another objective of the present disclosure is to provide a vise which can be selectively secured to a work surface magnetically.

Numerous other objects, advantages and features of the present disclosure will be readily apparent to those of skill in the art upon a review of the following drawings and description of a preferred embodiment.

DETAILED DESCRIPTION

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Figure 1:
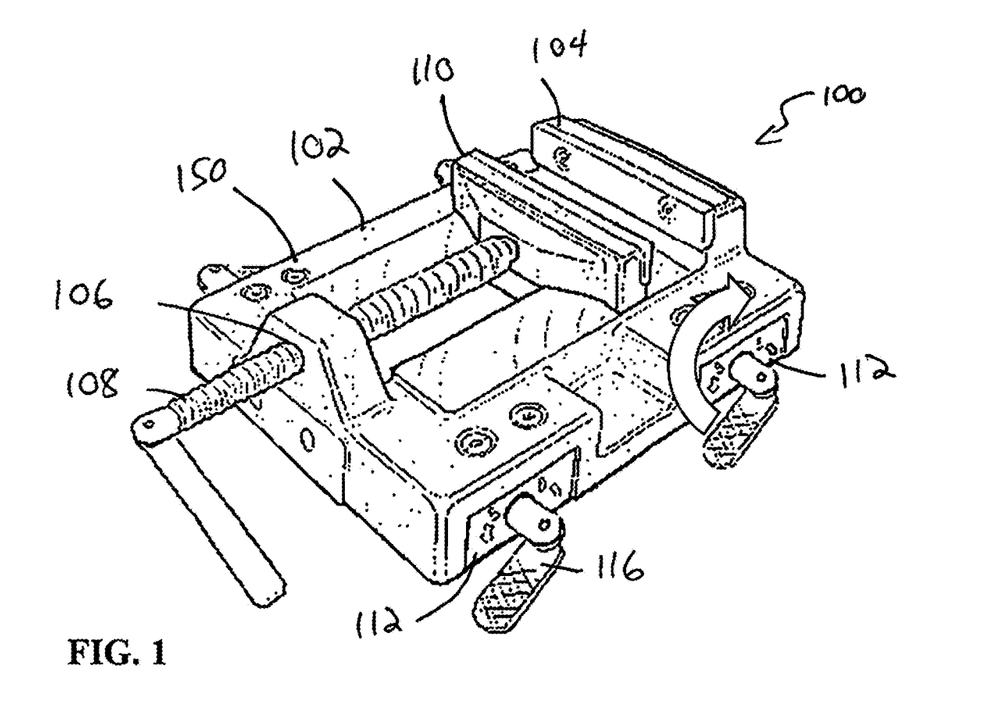
FIG. 1 is a perspective view of an embodiment of a vise of the present disclosure.
Figure 2:
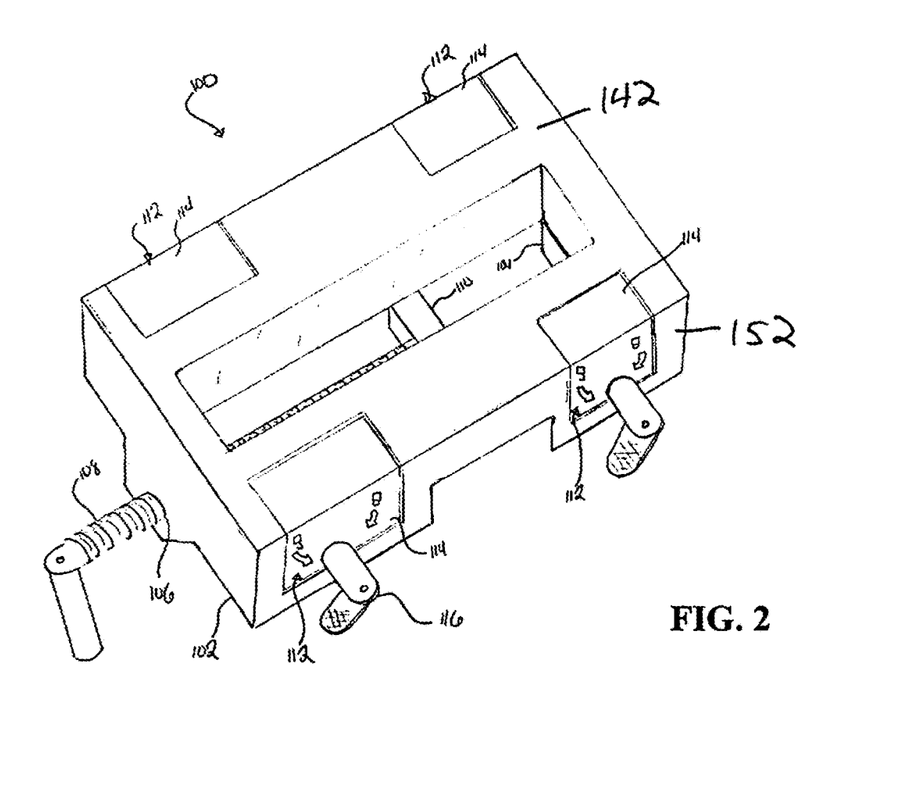
FIG. 2 is a bottom perspective view of the vise of FIG. 1.

Now referring to FIGS. 1 and 2, a vise 100 for securing a work piece is disclosed, the vise 100 having a base 102 or housing and a first jaw piece 104 and a second jaw piece 110 disposed on the base 102. One or more of the first and second jaw pieces 104 and 110 can be movably disposed on the base 102 such that the first and second jaw pieces 104 and 110 are moveable toward and away from one another on the base 102 to effectively clamp a work piece between the jaw pieces 104 and 110. In some embodiments, the first jaw piece 104 can be a stationary jaw piece fixedly connected to the base 102. The second jaw member 110 can be movably disposed on the base 102 to move toward and away from the first jaw piece 104 to selectively clamp a work piece between the first and second jaw pieces 104 and 110.

In some embodiments, a vise nut or threaded bore 106 can be positioned on the base 102. A screw or spindle 108 can be rotatably mounted on the base 102 and threadingly engaged with the vise nut or threaded bore 106, and the screw 108 can be rotatably coupled to the second jaw piece 110, the screw 108 being operable to selectively advance the second jaw piece 110 toward and away from the stationary jaw piece 104. In other embodiments, both jaw pieces 104 and 110 can be movable on the base 102, and/or the jaw pieces 104 and 110 can be movable on the base 102 via another clamping mechanism, such as a cam lever arm or scissoring lever arm clamping mechanism.

Figure 3:
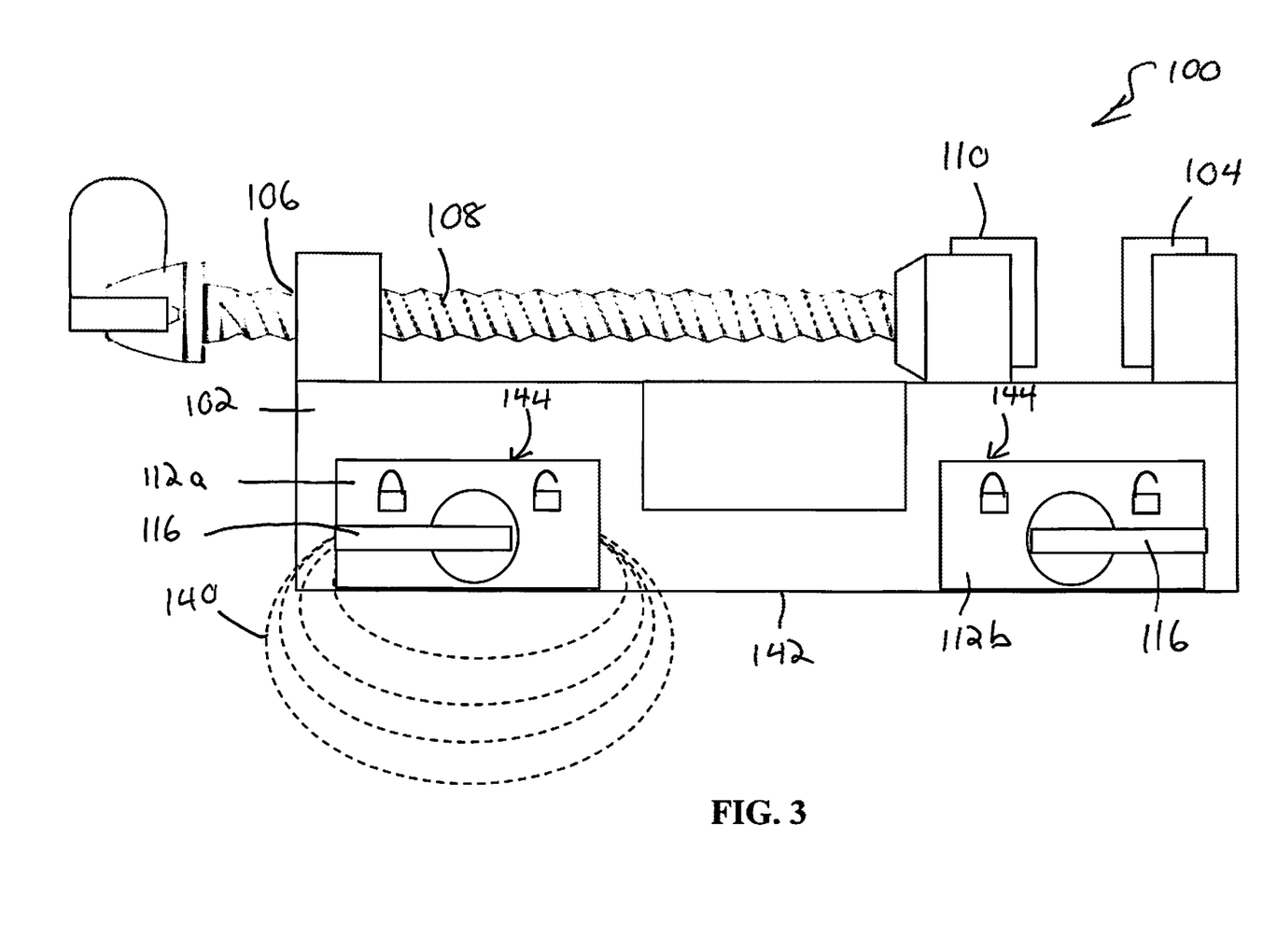
FIG. 3 is a side view of the vise of FIG. 1 showing multiple magnetic assemblies on a base of the vise, one being in an active mode and another in an inactive mode.

A magnetic assembly 112 may be positioned on or within the base 102. The magnetic assembly 112 can be utilized to produce a magnetic field exterior to or extending beyond the base 102, and can be used to attract the vise 100 to a magnetically permeable or ferromagnetic material or work surface to secure the vise 100 to the work surface. In some embodiments, the magnetic assembly 112 may include a permanent magnet which can be used to attract or secure the vise 100 to a magnetically permeable or ferromagnetic work surface when the vise 100 is positioned on or near the work surface. In other embodiments the magnetic assembly 112 may be switchable between an active mode and an inactive mode. As shown in FIG. 3, in some embodiments the magnetic assembly 112 can be operable by an actuator or lever 116 to alternate the magnetic assembly 112 between an active mode (left magnetic assembly 112a) and an inactive mode (right magnetic assembly 112b). By alternating between an active and an inactive mode, the magnetic assembly 112 may selectively produce a magnetic field 140 exterior to the magnetic assembly 112a and the base 102 to selectively attract or secure the vise 100 to magnetically permeable or ferromagnetic materials positioned adjacent a bottom surface 142 of the vise 100 utilizing the magnetic field 140 produced by the magnetic assembly 112.

In some embodiments, the base 102 can have a first or top side and a second or bottom side. The first and second jaw pieces 104 and 110 can be positioned on the first or top side of the base 102 and the magnetic assembly 112 can be placed on the second or bottom side of the base 102 such that the bottom side of the base 102 can be secured to a work surface via the magnetic assembly 112 and the work piece can be held on the first or top side of the base 102 via the jaw members 104 and 110 to be worked on or engaged by a tooling.

In some embodiments, the magnetic assembly 112 can be positioned within the base 102, for instance in a magnetic assembly recess 144 defined in the base 102. In some embodiments, a plurality of magnetic assemblies 112 may be dispersed throughout the base 102 of the vise 100. In some embodiments, as shown in FIG. 2, the plurality of magnetic assemblies 112 may be dispersed about an outer perimeter of the base 102. The base 102 of the vise 100 in some embodiments may be substantially rectangular and have four corners. The plurality of magnetic assemblies 112 can include at least four magnetic assemblies positioned on corresponding corners of the base 102. This allows the vise 100 to be anchored or secured to a magnetically permeable or ferromagnetic material or work surface via the magnetic assemblies 112 at multiple locations on the base 102 to produce distributed magnetic coupling or securement to the magnetically permeable or ferromagnetic work surface. In other embodiments, the base 102 can have various suitable shapes and the magnetic assemblies 112 can be placed in various suitable positions on the base 102.

An exemplary embodiment of an underside of a vise 100 and a plurality of magnetic assemblies 112 located on the vise 100 is provided in FIG. 2. The magnetic assemblies 112 may be positioned on the base 102 such that the undersides of the magnetic assemblies 112 are exposed with relation to the base 102 of the vise 100 and in some embodiments can be flush with a bottom surface 142 of the base 102, as shown in FIG. 3. Having the magnetic assemblies 112 flush with a bottom surface 142 of the base 102 can help reduce magnetic interference between the magnetic assemblies 112 and the work surface from the base 102. A flush orientation can also help minimize the distance between the magnetic assemblies 112 and the work surface to help maximize the magnetic forces applied to the magnetically permeable or ferromagnetic work surface and the magnetic assemblies 112 via the magnetic field 140 produced by the magnetic assemblies 112. In some embodiments, as shown in FIG. 2, the underside of the magnetic assemblies 112 can be slightly recessed from the bottom surface 142 of the base 102 of the vise 100.

In some embodiments, the magnetic assembly 112 can be operable to alternate between an active mode and an inactive mode as previously described herein. The active and inactive modes of the magnetic assembly 112 can be the result of a plurality of permanent magnets 128 and 130, with one magnet movable relative to the other magnet, the active mode resulting from the movable magnet being in a first position and the inactive mode resulting from the movable magnet being in a second position.

In some embodiments, a magnetic assembly 112 can generally include a magnetic assembly housing 114, a first permanent magnet 128 rotatably disposed within the magnetic assembly housing 114, a second permanent magnet 130 fixedly connected to the magnetic assembly housing 114, and a magnetic assembly actuator 116 coupled to the first permanent magnet 128 for rotating the first permanent magnet 128 within the magnetic assembly housing 114 to alternate the magnetic assembly 112 between an active mode and an inactive mode. In some embodiments, the magnetic assembly 112 can also include one or more magnetically permeable or ferromagnetic members positioned within the magnetic assembly housing 114 on one or more sides of the permanent magnets 128 and 130 through which magnetic fields 140 produced by the permanent magnets 128 and 130 can be passed and directed.

In some embodiments, the magnetic assembly housing 114 can be made of a magnetically permeable or ferromagnetic material and can act as the magnetically permeable or ferromagnetic members to provide the magnetically permeable or ferromagnetic medium through which the magnetic fields 140 produced by the permanent magnets 128 and 130 can pass. In other embodiments, the base 102 can act as the magnetic assembly housing 114, with the permanent magnets 128 and 130 rotatably disposed within the base 102 and fixedly connected to the base 102, respectively. In some embodiments, the base 102 can be made from a magnetically permeable or ferromagnetic material, including but not limited to steel or iron, through which the magnetic fields produced by the permanent magnets 128 and 130 can be passed or directed, such that the base 102 itself can become magnetized when the magnetic assembly 112 is placed in an active mode.

Figure 6:
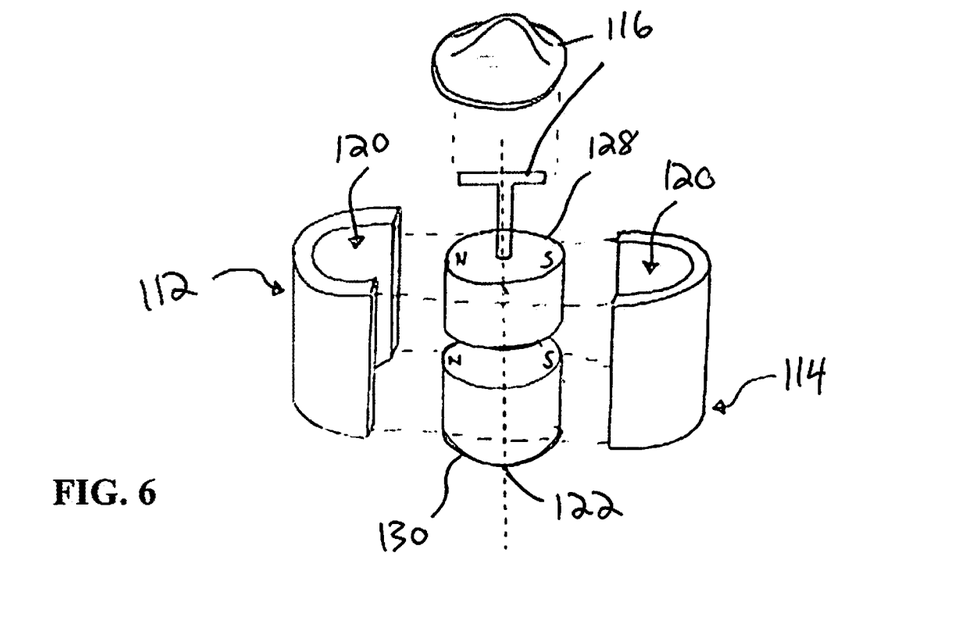
FIG. 6 is an exploded view of one of the magnetic assemblies from FIG. 5.

Now referring to FIG. 6, the magnetic assembly housing 114 may be shaped to receive the permanent magnets 128 and 130. In one embodiment, the magnetic assembly housing 114 can be in the shape of a block having a hollow passage 120 disposed along a rotational axis 122 of the magnetic assembly housing 114 and the magnetic assembly 112 about which the first permanent magnet 128 rotates. The hollow passage 120 may be in the shape of a cylinder or any other shape suitable to house the permanent magnets 128 and 130. The magnetic assembly housing 114 can have a variety of shapes and sizes as will be obvious to one of skill in the art.

Figure 4:
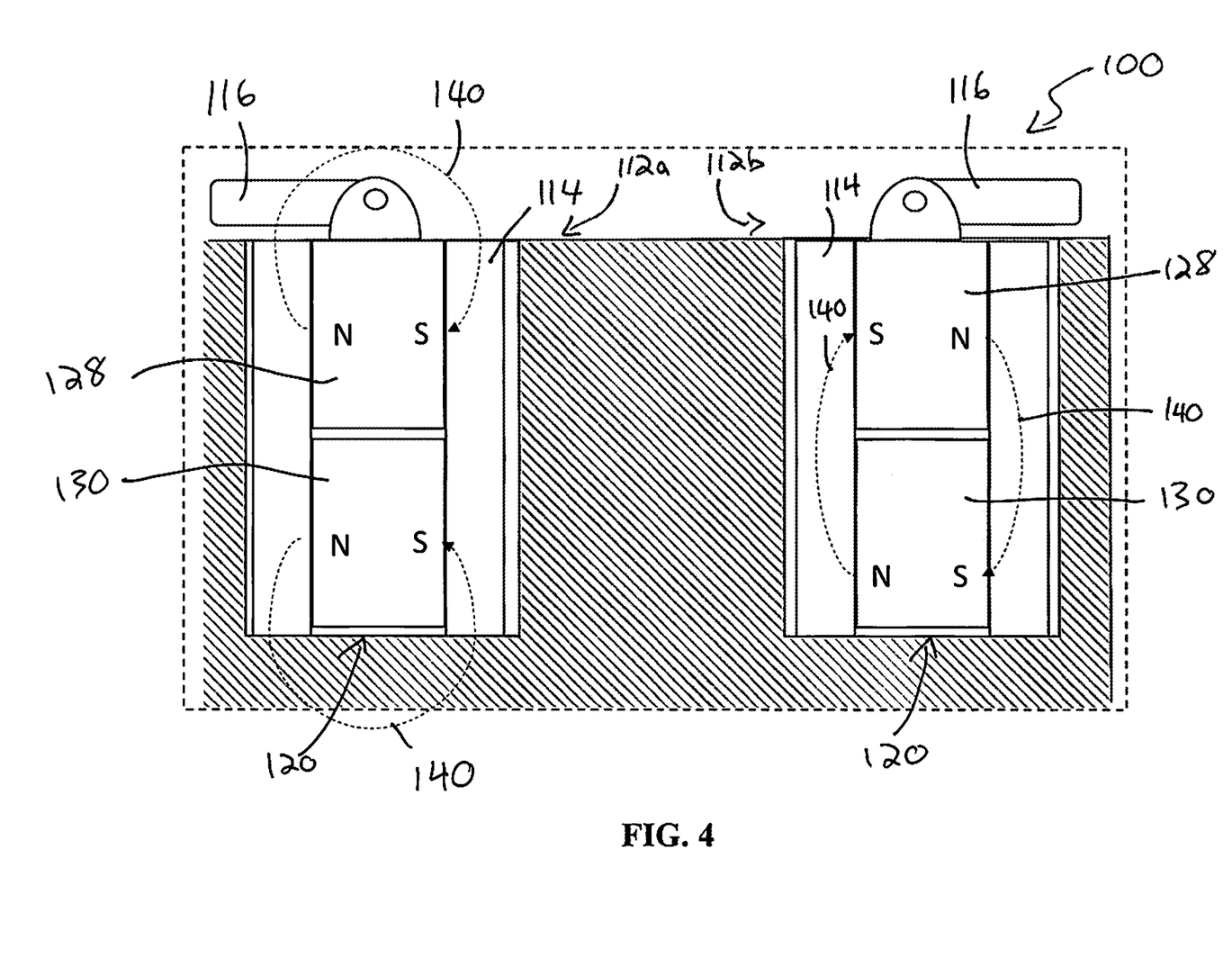
FIG. 4 is a cross sectional view of the vise of FIG. 1 showing magnetic field lines generated within magnetic assemblies in either an active or an inactive mode.
Figure 7:
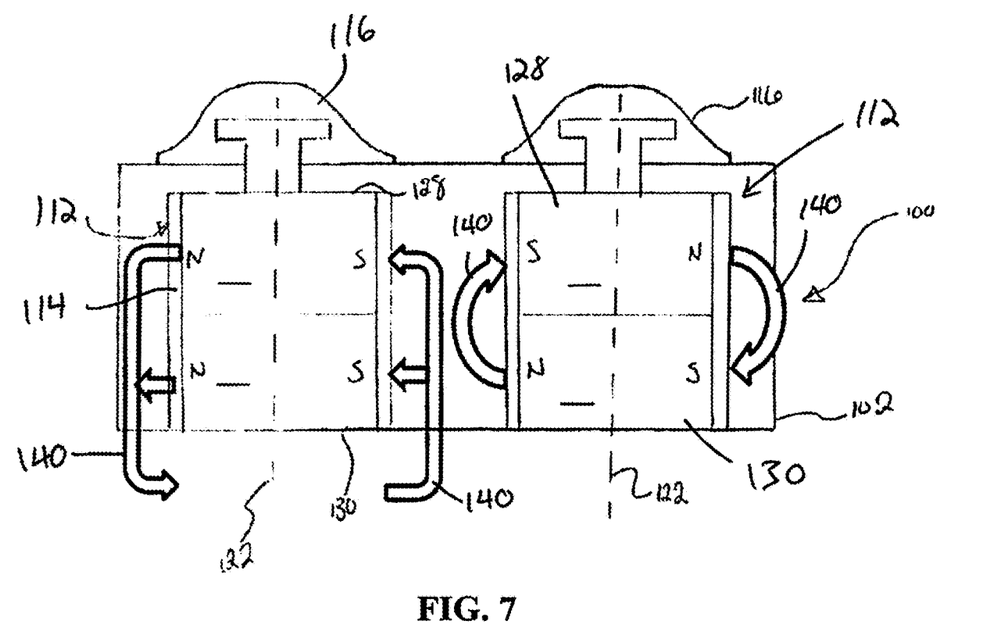
FIG. 7 is a cross sectional view of the vise of FIG. 5 showing magnetic field lines generated within magnetic assemblies in either an active or an inactive mode.

Further referring to FIGS. 4 and 7, a first permanent magnet 128 and a second permanent magnet 130 can be disposed within the hollow passage 120 of the magnetic assembly housing 114. In some embodiments, the first permanent magnet 128 can be rotatable about the rotational axis 122 when positioned in the hollow passage 120. In other embodiments, the first permanent magnet 128 can be rotatable along an axis transverse to the rotational axis 122 when positioned in the hollow passage 120. The rotation of the first permanent magnet 128 relative to the second permanent magnet 130 can alternate the magnetic assembly 112 between an active and an inactive mode.

When the magnetic assembly 112 is in an active mode, as shown in the left magnetic assembly of FIGS. 4 and 7, like poles of the first permanent magnet 128 and the second permanent magnet 130 can generally be oriented in or towards the same direction. For example, a north pole of the first permanent magnet 128 and a north pole of the second permanent magnet 130 can face or be oriented toward a first direction and a south pole of the first permanent magnet 128 and a south pole of the second permanent magnet 130 are facing a second opposing direction. Magnetic fields produced by the two permanent magnets 128 and 130 are additive or have a cumulative effect to produce a magnetic field exterior to the magnetic assembly 112 as the magnetic fields produced by the north pole of the first permanent magnet 128 are repelled by the north pole of the second permanent magnet 130 and vice versa. The magnetic fields produced by the permanent magnets 128 and 130 can be directed out of the axial ends of the magnetic assembly 112 as well as various other directions and toward the attractive south poles of the first and second permanent magnets 128 and 130. Thus, when like poles of the first and second permanent magnets 128, 130 are oriented in or toward the same direction or the magnets 128 and 130 have the same polar orientation within the magnetic assembly 112, the magnetic fields 140 of the first and second permanent magnets 128, 130 are cumulative and can extend out from the magnetic assembly 112 exterior to the magnetic assembly 112 and beyond the base 102.

Also seen in the right hand magnetic assembly 112 of FIGS. 4 and 7, when the magnetic assembly 112 is in an inactive mode, like poles of the first permanent magnet 128 and the second permanent magnet 130 are oriented in opposite directions such that the magnets 128 and 130 have opposite polar orientations. For example, a north pole of the first permanent magnet 128 and a south pole of the second permanent magnet 130 are oriented toward a first direction and a north pole of the first permanent magnet 128 and a south pole of the second permanent magnet 139 are oriented toward a second direction. When the first and second permanent magnets 128, 130 have opposite polarities or polar orientations, the magnetic field 140 produced by a north pole of one permanent magnet will be attracted to the south pole of the other permanent magnet oriented in the same direction, such that the magnetic fields 140 of the first and second permanent magnets 128, 130 are substantially consumed, contained, or collapsed within the magnetic assembly 112 without extending beyond the base 102.

In an inactive mode, the vise 100 can be easily removed from or repositioned on a magnetically permeable or ferromagnetic work surface. Once the vise 100 is placed in a new desired position or orientation, the actuator 116 can be rotated to return the magnetic assembly 112 to the active mode and magnetically secure the vise 100 to the magnetically permeable or ferromagnetic work surface.

In some embodiments, the actuator 116 which can be coupled to the first permanent magnet 128 to rotate the first permanent magnet 128 between an active mode and inactive mode position can include a lever arm which extends from the magnetic assembly 112 transverse to the rotational axis 122 to provide leverage in rotating the actuator 116 about the rotational axis 122. Thus the farther the actuator 116 extends from the central axis 122, the greater the moment arm possible when applying a force to the actuator 116 to reorient the first permanent magnet 128 with respect to the second permanent magnet 130. A longer moment arm may be needed depending on the strength of the permanent magnets 128 and 130 to overcome the attractive magnetic forces of the permanent magnets 128 and 130 in the inactive mode and place the magnetic assembly 112 in the active mode. The actuator 116 may be connected to the first permanent magnet 128 such that rotation of the actuator 116 about the rotational axis 122 results in a rotation of the first permanent magnet 128 about the rotational axis 122, reorienting the first permanent magnet 128 relative to the second permanent magnet 130 and alternating the magnetic assembly 112 between an active and an inactive mode.

Figure 5:
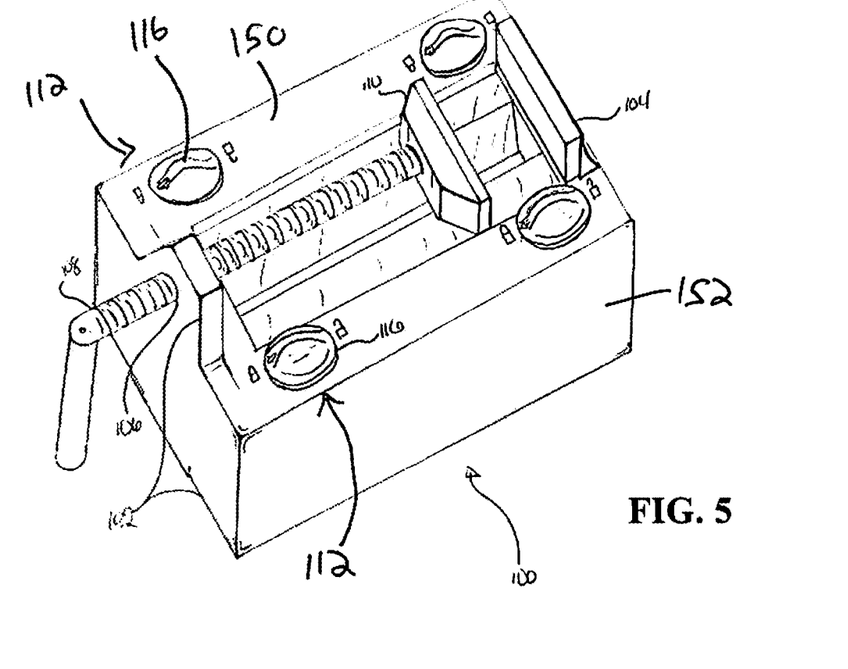
FIG. 5 is a perspective view of another embodiment of a vise of the present disclosure having levers or handles for actuating magnetic assemblies extending from a top of a base of the vise.

In some embodiments, the base 102 can have a bottom surface 142, a top surface 150, and lateral sides 152. In some embodiments, the actuator 116 can extend from one of the lateral sides 152 of the base 102, as shown in FIG. 1. In other embodiments, the actuator 116 can extend from the top surface 150 of the base, as shown in FIG. 5. Having the actuator 116 extend from a top surface 150 or lateral side 152 of the base 102 can provide for easier access and manipulation of the actuator 116 and the magnetic assembly 112. In some embodiments, as shown in FIG. 4, the actuator 116 can be configured to rotate the first permanent magnet 128 through 180 degrees of rotation to reverse the polar orientation of the first permanent magnet 128 on the magnetic assembly 112.

Figure 8:
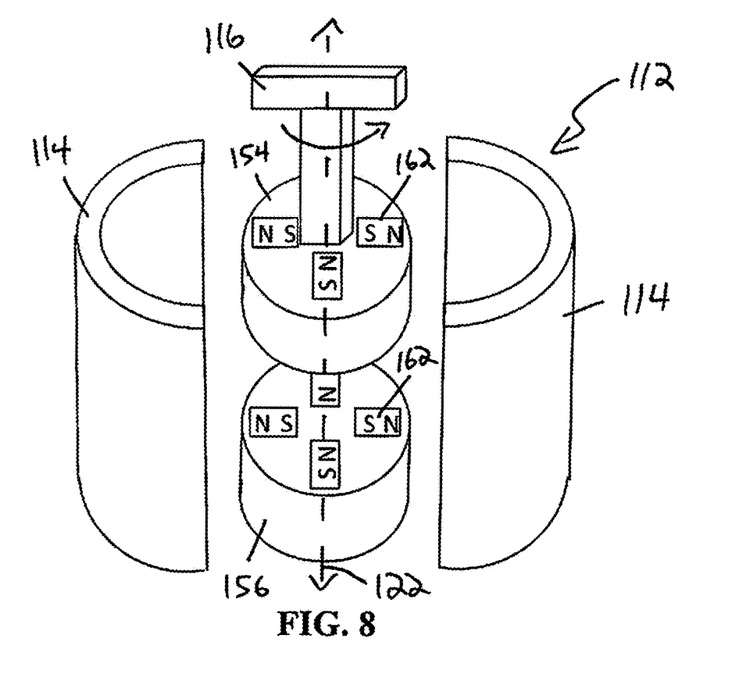
FIG. 8 is an exploded view of another embodiment of a magnetic assembly of the present disclosure having permanent magnet assemblies with radially oriented permanent magnet elements.

In still other embodiments, as shown in FIG. 8, the magnetic assembly 112 can include first and second permanent magnet assemblies 154 and 156, each permanent magnet assembly 154 and 156 including a permanent magnet assembly housing 158 and a plurality of permanent magnet elements 162, the permanent magnet elements 162 on each permanent magnet housing 158 being spaced radially about the rotational axis 122 of the magnetic assembly 112. In some embodiments, the permanent magnet elements 162 can be spaced radially symmetrically about the rotational axis 122 of the magnetic assembly 112. The permanent magnet elements 162 can be oriented with their polarities in a radial direction, and the permanent magnet elements 162 can have alternating polar orientations. In an active mode, the polar orientation of each permanent magnet element 162 in the first permanent magnet assembly 154 can be the same as an aligned corresponding permanent magnet element 162 in the second permanent magnet assembly 156. The permanent magnet assembly housing 158 of the first permanent magnet assembly 154 can then be rotated until the permanent magnetic assemblies 154 and 156 are oriented with each aligned corresponding pairs of permanent magnet elements 162 on the first and second permanent magnet assemblies 154 and 156 having opposite polar orientations, to place the magnetic assembly 112 in the inactive mode. Each corresponding pair of aligned permanent magnet elements 162 can produce similar magnetic field interactions as shown in FIG. 4, depending on whether the magnetic assembly 112 is in the active or inactive mode. In such an embodiment, the first permanent magnet assembly 154, and thus the actuator 116, may only need to be rotated through a smaller angular rotation, such as 120, 90, 60, etc. degrees, depending on the number of permanent magnet elements 162 in each permanent magnet assembly, to alternate the magnetic assembly 112 between the inactive and inactive mode, which can be beneficial in applications where space to maneuver the actuator 116 is limited.

Figure 9:
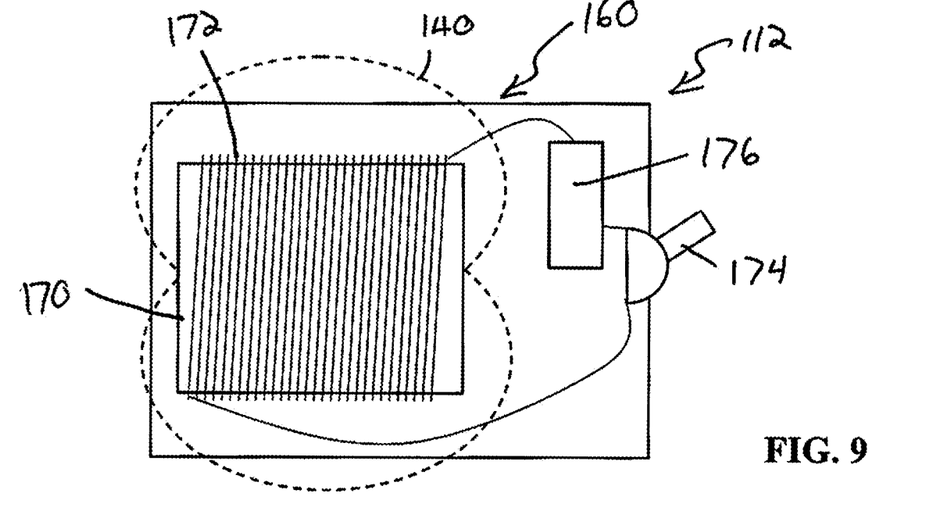
FIG. 9 is a schematic view of another embodiment of a magnetic assembly of the present disclosure including an electromagnet.
Figure 10:
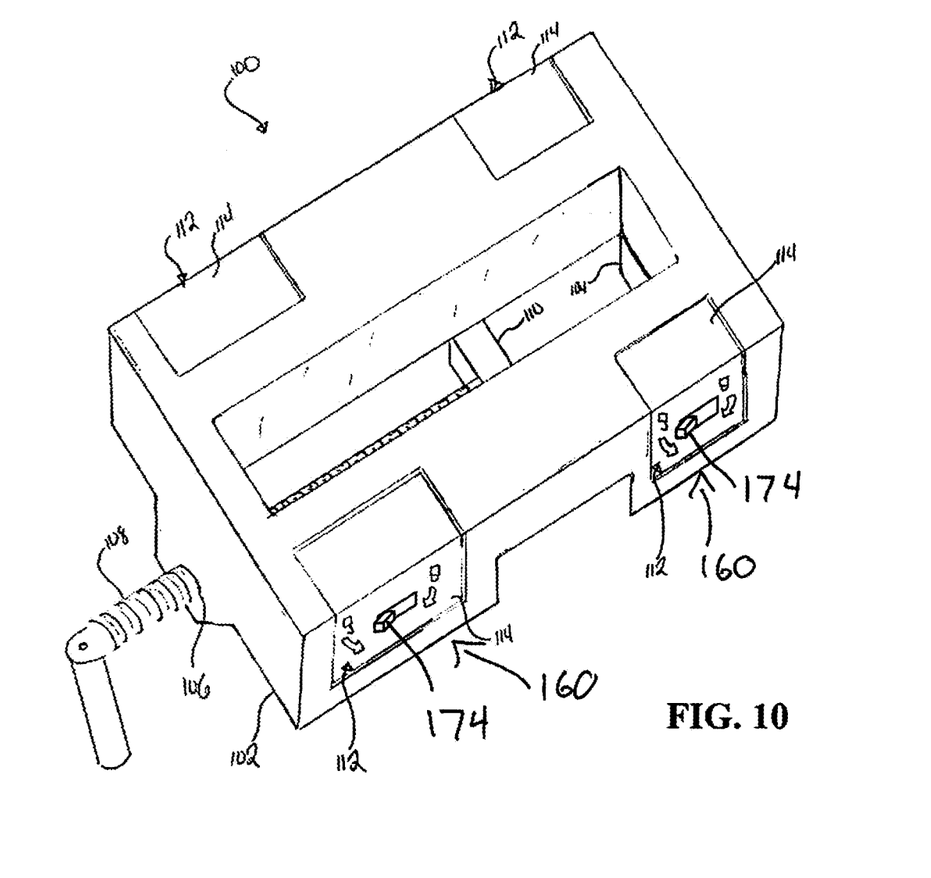
FIG. 10 is a bottom perspective view of another embodiment of a vise of the present disclosure utilizing the electromagnet of FIG. 9.

In other embodiments, as shown in FIGS. 9-10, the magnetic assembly 112 can include an electromagnet 160 The electromagnet 160 may include an electromagnetic core 170, a wire 172 coiled around the electromagnetic core 170, and a power source 176 in electrical communication with the wire 172. A switch actuator 178 can selectively complete the electrical circuit between the power source 176 and the electrical wire 172 to supply power from the power source 176 to the electrical wire 172. When a current is running through the wire 172, a magnetic field 140 can be produced by the current in the wire 172 which magnetizes the core 170 and places the magnetic assembly 112 in the active mode. The magnetized core 170 can than then be used to apply magnetic forces between the vise 100 and a magnetically permeable or ferromagnetic work surface to secure the vise 100 to the magnetically permeable or ferromagnetic work surface.

The vise 100 may have a plurality of magnetic assemblies. The plurality of magnetic assemblies may be positioned throughout the base 102 of the vise 100 such that the magnetic assemblies 112 may provide various anchor points for the vise 100. In some embodiments, a single vise actuator 116 may be used to actuate all of the plurality of magnetic assemblies 112, or each of the magnetic assemblies 112 may be actuated by a separate vise actuator 116. For instance, in some embodiments, the vise 100 can include a plurality of magnetic assemblies 112 including electromagnetics, wherein the coils associated with the magnetic assemblies 112 can be connected to the same circuit, powered by a single power source, and actuated via a single electrical switch.

Figure 11:
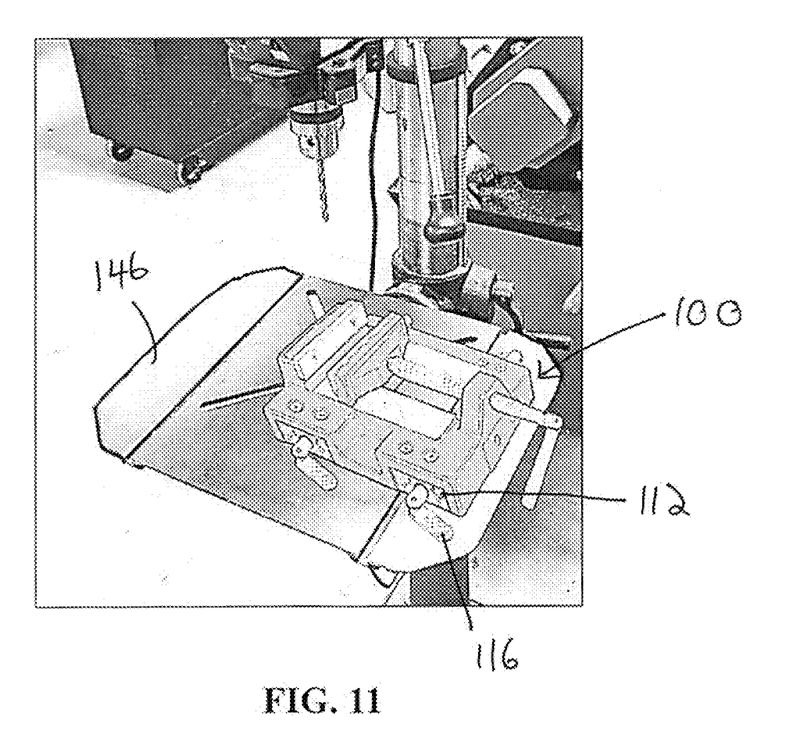
FIG. 11 is a perspective view of the vise of FIG. 1 magnetically secured to a drill press table.

The vise 100 of the present disclosure may be anchored or coupled to any suitable magnetically permeable or ferromagnetic material or work surface via a magnetic engagement when at least one of the plurality of magnetic assemblies 112 is placed in the active mode such that a resultant magnetic field is produced exterior to the magnetic assembly 112 and the base 102. For example, in FIG. 11, the vise is shown being magnetically secured to a work table 146 of a drill press. However the vise 100 can be secured to any suitable magnetically permeable or ferromagnetic work surface, such as a general work table, work benches, saw horses, band saw work surfaces, table saw work surfaces, milling machine work tables, etc.

Thus, although there have been described particular embodiments of the present invention of a new and useful VISE WITH MAGNET, it is not intended that such references be construed as limitations upon the scope of this invention.

What is claimed is:

1. A vise for securing a work piece, the vise comprising:
   a base;
   a first jaw piece and a second jaw piece disposed on the base, at least one of the first and second jaw pieces movable on the base such that the first and second jaw pieces are moveable toward and away from one another; and
   a magnetic assembly positioned on the base, the magnetic assembly including a first permanent magnet and a second permanent magnet, the first permanent magnet rotatable relative to the second permanent magnet to alternate the magnetic assembly between an active mode and an inactive mode, wherein the magnetic assembly produces a magnetic field that extends exterior to the magnetic assembly when the magnetic assembly is in the active mode.

2. The vise of claim 1, wherein
   the magnetic assembly includes a magnetic assembly housing secured to the base;
   the first permanent magnet is rotatably disposed on the magnetic assembly housing; and
   the second permanent magnet is fixedly connected to the magnetic assembly housing, such that the first permanent magnet is rotatable on the magnetic assembly housing relative to the second permanent magnet.

3. The vise of claim 2, wherein:
   the first permanent magnet has a first north pole and an opposing first south pole;
   the second permanent magnet has a second north pole and an opposing second south pole; and
   the magnetic assembly is in an active mode when the first north pole of the first permanent magnet is oriented in the same direction as the second north pole of the second permanent magnet.

4. The vise of claim 3, wherein the magnetic assembly is placed in an inactive mode when the first permanent magnet is rotated such that the first north pole on the first permanent magnetic and the second north pole of the second permanent magnet are oriented in opposite directions from one another.

5. The vise of claim 1, further comprising an actuator connected to the first permanent magnet, the actuator being rotatable to rotate the first permanent magnet on the magnetic assembly to alternate the magnetic assembly between the active mode and the inactive mode.

6. The vise of claim 5, wherein the actuator includes a lever arm configured to rotate the first permanent magnet through 180 degrees of rotation to reverse the polar orientation of the first permanent magnet.

7. The vise of claim 6, wherein the base includes a bottom surface and lateral sides, and the lever arm extends outward from one of the lateral sides of the base.

8. The vise of claim 6, wherein the base includes a top surface, and the lever arm extends outward from the top surface of the base.

9. The vise of claim 1, wherein the magnetic assembly is positioned on a first side of the base and the first and second jaw pieces are located on an opposing second side of the base.

10. The vise of claim 1, wherein:
    the first jaw piece is fixed on the base; and
    the vise further comprises a spindle rotatably mounted on the base and connected to the second jaw piece, wherein rotation of the spindle causes the second jaw piece to move relative to the first jaw piece.

11. The vise of claim 1, wherein:
    the base is substantially rectangular and has four corners; and
    the vise further comprises four magnetic assemblies, each of the at least four magnetic assemblies positioned proximate to a corresponding corner of the base.

12. The vise of claim 1, wherein the base has a bottom surface, and the magnetic assembly is positioned on the base such that the magnetic assembly is flush with the bottom surface of the base.

13. The vise of claim 1, wherein the magnetic assembly produces a magnetic field that extends beyond the bottom surface of the base.

14. A vise for securing a work piece, the vise comprising:
    a base having a first side and a second side;
    a first jaw piece and a second jaw piece disposed on the base adjacent the first side of the base, at least one of the first and second jaw pieces movable on the base such that the first and second jaw pieces are moveable toward and away from one another; and
    a plurality of magnetic assemblies located on and spaced from one another adjacent the second side of the base, each of the magnetic assemblies configured to produce a magnetic field beyond the second side of the base,
    wherein the magnetic assemblies are operable to alternate between an active mode and an inactive mode, the magnetic assemblies producing a magnetic field that extends beyond a bottom surface of the base when the magnetic assembly is in the active mode.

15. The vise of claim 14, wherein:
    the magnetic assembly includes a first permanent magnet and second permanent magnet, the first permanent magnet rotatable relative to the second permanent magnet to alternate the magnetic assembly between the active mode and the inactive mode; and
    when the magnetic assembly is in the inactive mode, the first and second permanent magnets are oriented such that the magnetic field produced by the first permanent magnet is attracted to and collapses into the second permanent magnet without extending beyond the base, and vice versa.

* * * * *